UNITED STATES PATENT OFFICE.

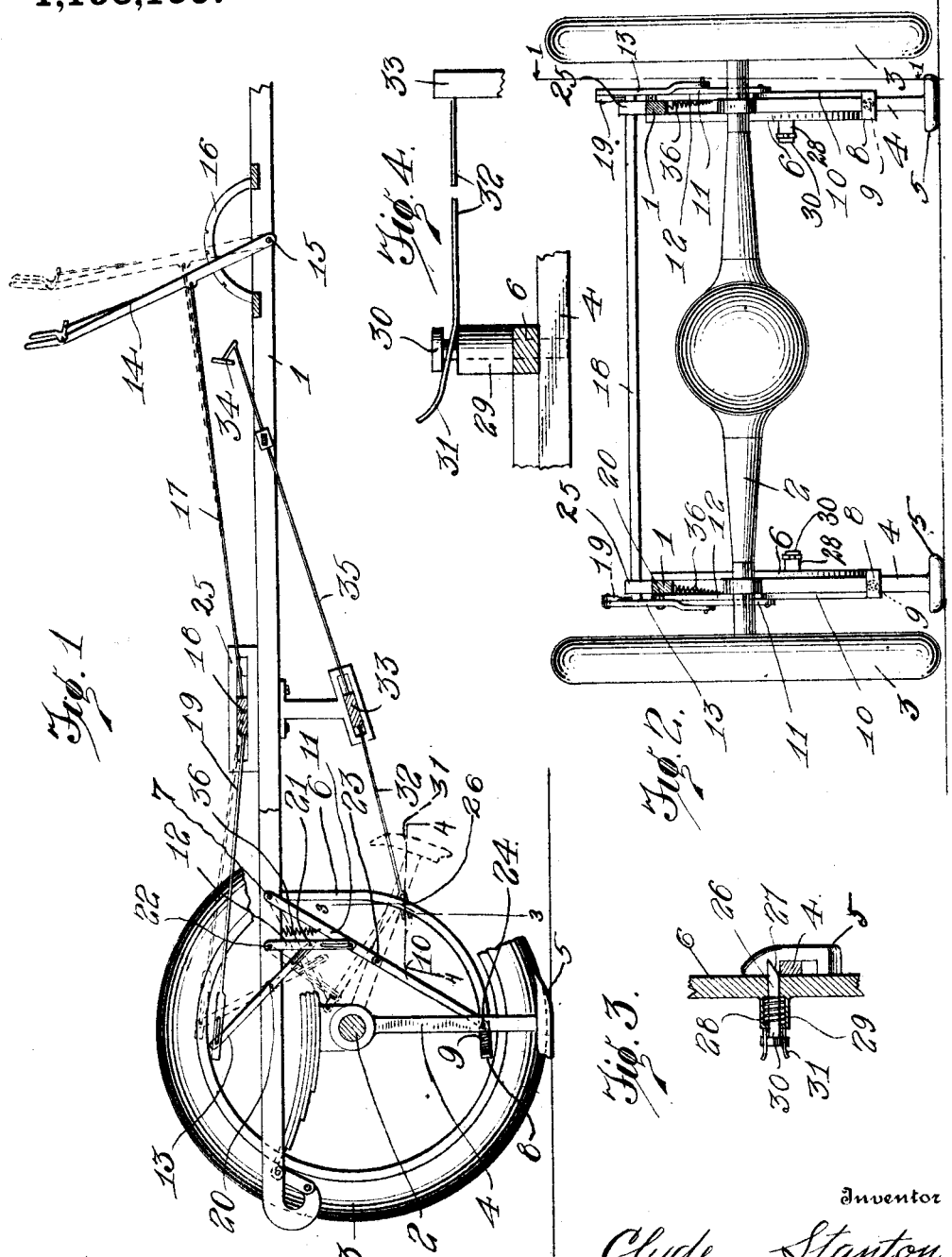

CLYDE STANTON, OF ONO, CALIFORNIA.

EMERGENCY-BRAKE.

1,193,199.   Specification of Letters Patent.   Patented Aug. 1, 1916.

Application filed June 11, 1915. Serial No. 33,539.

*To all whom it may concern:*

Be it known that I, CLYDE STANTON, citizen of the United States, residing at Ono, in the county of Shasta and State of California, have invented certain new and useful Improvements in Emergency-Brakes, of which the following is a specification.

My invention is designed as an improved emergency brake and as its primary object contemplates a brake which is particularly adapted for use on automobiles and other road vehicles, and which is so constructed as to operate directly on the road-bed to retard the movement of the vehicle to which it is attached.

A further object of the invention is to provide a brake which can be operated to prevent skidding of the vehicle, and which may be employed in locking the vehicle against movement when the latter is not in use.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a fragmentary longitudinal sectional view of an automobile equipped with my improved emergency brake; Fig. 2 is a rear end view of the device as illustrated in Fig. 1; Fig. 3 is a fragmentary sectional view illustrating in detail the construction of the lock mechanism utilized to support the brake shoe out of engagement with the road bed; and Fig. 4 is a view similar to Fig. 3, taken however at a different angle.

Before proceeding with a description of the drawings I desire to call particular attention to the fact that while I have evolved my invention with reference to its use as an emergency brake for automobiles, the same, if desired, may be used in connection with vehicles generally.

Referring now to the drawings by numerals, 1 designates the chassis, 2 the rear axle and 3 the rear wheels of an automobile. A support arm 4 is hung to depend from the rear axle 2 in proximity to each of the mentioned rear wheels 3, the mentioned arm being equipped at its free end with a brake shoe 5 which, when moved into a braking position, is adapted for direct contact with the road bed to slightly elevate the rear end of the chassis 1, and by such action, permit the drive wheel of the machine to rotate without moving the machine. In view of the fact that the operating mechanism for each of the mentioned brake devices is the same, a description of one only will ensue.

An arcuate guide 6 is rigid with the chassis 1 at a point 7 forwardly of the rear axle 2 to extend downwardly therefrom and throughout the greater portion of its length concentric to the axle to a point 8 below and slightly at the rear of said axle where it is laterally bent or extended. Said extension acts as an abutment for one end of a spring 9, said spring affording a cushioning element for the arms 4 when moved relatively to said guide and into a braking position.

A plurality of connected levers are utilized to move the brake device from a position in engagement with the road bed to a position out of engagement therewith or from the position shown in Fig. 1 to the position indicated by the dotted lines in said figure. The levers thus utilized have been designated respectively 10, 11, 12, 13 and 14, the latter, lever 14, hereinafter termed the operating lever, being positioned forwardly of the chassis 1 in proximity to the operator's seat to be thus subjected to manual control. Lever 14 is pivoted as at 15 to the chassis and is mounted to operate over a quadrant 16 in a manner old in the art. A rod 17 connects said lever 14 with an equalizer cross rod 18, which latter rod, by means of a rod 19 is connected to the lever 13 previously noted. Movement of equalizer rod 18 will cause the arms (one for each rear wheel) to operate in unison. Lever 13 is pivoted as at 20 intermediate its ends to the chassis 1 and connected at its opposite end at a point 21 intermediate the ends of the lever 12, which latter lever, as shown to advantage in Fig. 1, is pivoted as at 22 and hung to depend from the chassis 1 forwardly of the pivot point 20 just described but rearwardly of the point 7 where the guide 6 is secured. Lever 12 at its opposite end is connected to the lever 11. Said lever 11 is pivoted to the chassis at the point 7 above noted and pivotally connected as at 23 with the lever 10, the latter having pivotal connection as indicated at 24 with said arm.

Movement of the lever 14 from the position indicated in full lines to the position indicated by the dotted lines in Fig. 1 will cause the brake device to move as hereinbefore stated. A forward movement of the lever 14 will exert a forward pull on the rod 17 and by such pull, slide the equalizer rod 18 forwardly of the bracket 25 within which it is mounted. Movement of the equalizer rod 18 will cause a forward pull to be exerted on the rod 19 and consequently cause lever 13 to be rotated about its pivot 20. Movement of the lever 13 about its fulcrum point 20 will cause lever 12 to be pulled rearwardly, and said lever, by reason of its connection with the lever 11, causing the latter to be swung from its pivot 7 toward the chassis and lever 10, by reason of its connection as at 23 to correspondingly move toward the chassis and by such movement elevate the arm from a position in engagement with the road bed to a position entirely out of engagement therewith. Levers 11 and 10, when the brake device is in a braking position, are alined. That the levers may properly operate, the connection therebetween may be as indicated in the drawings, the slots and pins shown but not numbered permitting of unobstructed movement.

Coming now to the means utilized to maintain the brake device out of engagement with the road bed when elevated through operation of lever 14, 26 designates a retaining pin carried by the guide 6 in the path of movement of the brake shoe arm 4. As shown to advantage in Fig. 3, pin 26 is provided with a beveled end 27 with which said arm 4 engages, that the pin, during upward movement of said arm, may recede. A spring 28 inclosed in an enlargement 29 of the guide 6 is provided to normally maintain the pin 26 extended beyond said guide and in the path of movement of said arm 4. An enlargement 30 is formed on the pin beneath which enlargement, curved fingers 31 are arranged, the mentioned fingers being integral with a rod 32, the fingers extending rearwardly from an equalizer rod 33 arranged beneath the chassis and actuatable through movement of a foot pedal 34 connected to the equalizer rod by means of a connecting rod 35. Movement of the pedal 34 will cause the fingers 31 to correspondingly move and, by such movement, and by curvature noted in Fig. 4, cause pin 26 to be actuated against tension of its associated spring 28 until said pin is free from engagement with the arm 4. When thus released, the expansion spring 36, connected, at one end to the chassis and at its opposite end to the lever 11 will cause the levers before noted to so automatically move as to swing the brake shoe into engagement with the road bed and into a braking position. Movement of the brake shoe in the manner last stated will be cushioned by the spring 9 noted above.

From the foregoing, taken in connection with the accompanying drawings it is apparent that the brake shoe can only be withdrawn from engagement with the road bed through manipulation of lever 14 and moved into engagement therewith through manipulation of pedal 34; that the manipulation of the pedal 34 need only be sufficient to retract pin 26, in which event movement of the brake shoe into braking position is absolutely automatic and controlled through action of spring 36; and that the length of the brake shoe arm 4 is sufficient to elevate, as before pointed out, the rear drive wheels of the machine slightly above the road bed and entirely out of engagement with the ground.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. An emergency brake including the combination with a motor vehicle, of an arm oscillatably mounted upon the rear axle, a brake shoe on said arm, a guide for the arm depending from the vehicle frame, releasable retaining means on the guide for retaining the arm in raised position to maintain the shoe out of engagement with the road bed, means for releasing said retaining means, a lever pivoted to the frame, a link forming a connection between said lever and the arm, and means for rotating the lever to thereby return the arm to original position.

2. An emergency brake, including the combination with a motor vehicle of an arm oscillatably mounted upon the rear axle, a brake shoe on the arm, an arcuate guide for said arm depending from the frame, releasable retaining means upon the guide engaging the arm to retain the brake shoe out of engagement with the road bed, means for releasing said retaining means to permit the brake arm and shoe to move into operable position, a lever fulcrumed upon the frame, a link connecting said lever with the arm, a second lever fulcrumed upon the frame and having a slotted portion, a pin on the first lever engaging in said slotted portion, a third lever fulcrumed upon the frame and having a slotted portion, a pin on the second lever engaging in the slotted portion on the third lever, and means for moving the third lever to cause movement of the other two levers and thereby raise the arm to original position.

3. An emergency brake including in combination with a motor vehicle, an arm oscillatably mounted upon the rear axle, a brake shoe on the arm, a guide for the arm, a pin slidably mounted within the guide and having a beveled end, a spring for urging the beveled end of the pin beyond the plane of the guide whereby to engage and retain the arm in a raised position to maintain the brake shoe out of engagement with the road bed, a head on said pin, a rod having fingers bent out of the plane of the rod and adapted to engage the head and opposite sides of the pin, means for pulling the rod whereby the pin is retracted and the arm released to permit the brake shoe to engage the road bed, and means for returning the arm to original position.

In testimony whereof I affix my signature in presence of two witnesses.

CLYDE STANTON.

Witnesses:
LENA D. FOSTER,
FRANK STANTON.